US009084068B2

(12) United States Patent
Abrahamsson et al.

(10) Patent No.: US 9,084,068 B2
(45) Date of Patent: Jul. 14, 2015

(54) SENSOR-BASED PLACEMENT OF SOUND IN VIDEO RECORDING

(75) Inventors: Bengt Magnus Abrahamsson, Loddekopinge (SE); Martin Nyström, Hörja (SE); Åke Rydgren, Södra Sandby (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 785 days.

(21) Appl. No.: 13/118,531

(22) Filed: May 30, 2011

(65) Prior Publication Data

US 2012/0307048 A1 Dec. 6, 2012

(51) Int. Cl.
| | |
|---|---|
| *H04N 13/02* | (2006.01) |
| *H04S 5/00* | (2006.01) |
| *H04N 7/14* | (2006.01) |
| *H04N 5/77* | (2006.01) |
| *H04S 7/00* | (2006.01) |
| *G10L 21/0208* | (2013.01) |
| *H04M 1/60* | (2006.01) |
| *H04R 3/00* | (2006.01) |
| *H04R 29/00* | (2006.01) |
| *G10L 21/0216* | (2013.01) |

(52) U.S. Cl.
CPC ............... *H04S 5/005* (2013.01); *H04N 5/772* (2013.01); *H04N 7/142* (2013.01); *H04S 7/30* (2013.01); *G06T 2207/10004* (2013.01); *G06T 2207/10016* (2013.01); *G06T 2207/30201* (2013.01); *G10L 21/0208* (2013.01); *G10L 2021/02166* (2013.01); *H04M 1/6041* (2013.01); *H04M 2250/52* (2013.01); *H04R 3/005* (2013.01); *H04R 29/005* (2013.01); *H04S 2400/11* (2013.01); *H04S 2420/01* (2013.01)

(58) Field of Classification Search
CPC ........... G06T 2207/10016; G06T 2207/10004; G06T 2207/30201; G10L 21/0208; G10L 2021/02166; H04S 5/005; H04S 7/30; H04S 2420/01; H04S 2400/11; H04M 2250/52; H04M 1/6041; H04N 7/142; H04N 5/772; H04R 3/005; H04R 29/005
See application file for complete search history.

(56) References Cited

U.S. PATENT DOCUMENTS

| | | | |
|---|---|---|---|
| 2009/0323981 A1* | 12/2009 | Cutler | 381/92 |
| 2010/0026780 A1* | 2/2010 | Tico et al. | 348/14.02 |
| 2011/0069229 A1* | 3/2011 | Lord | 348/461 |
| 2011/0157327 A1* | 6/2011 | Seshadri et al. | 348/51 |

* cited by examiner

*Primary Examiner* — Joseph Ustaris
*Assistant Examiner* — Jill Sechser
(74) *Attorney, Agent, or Firm* — Snyder, Clark, Lesch & Chung, LLP

(57) ABSTRACT

A method may include receiving video recorded with a camera and audio recorded with a microphone, wherein the video and audio were recorded simultaneously, and wherein the microphone is configured to move relative to the camera. The method may further include receiving a selection from a user of an object in the video, wherein the object is collocated with the microphone that recorded the audio. The method may further include tracking the object in the video and determining a location over time of the microphone relative to the camera based on the tracking of the object.

17 Claims, 13 Drawing Sheets

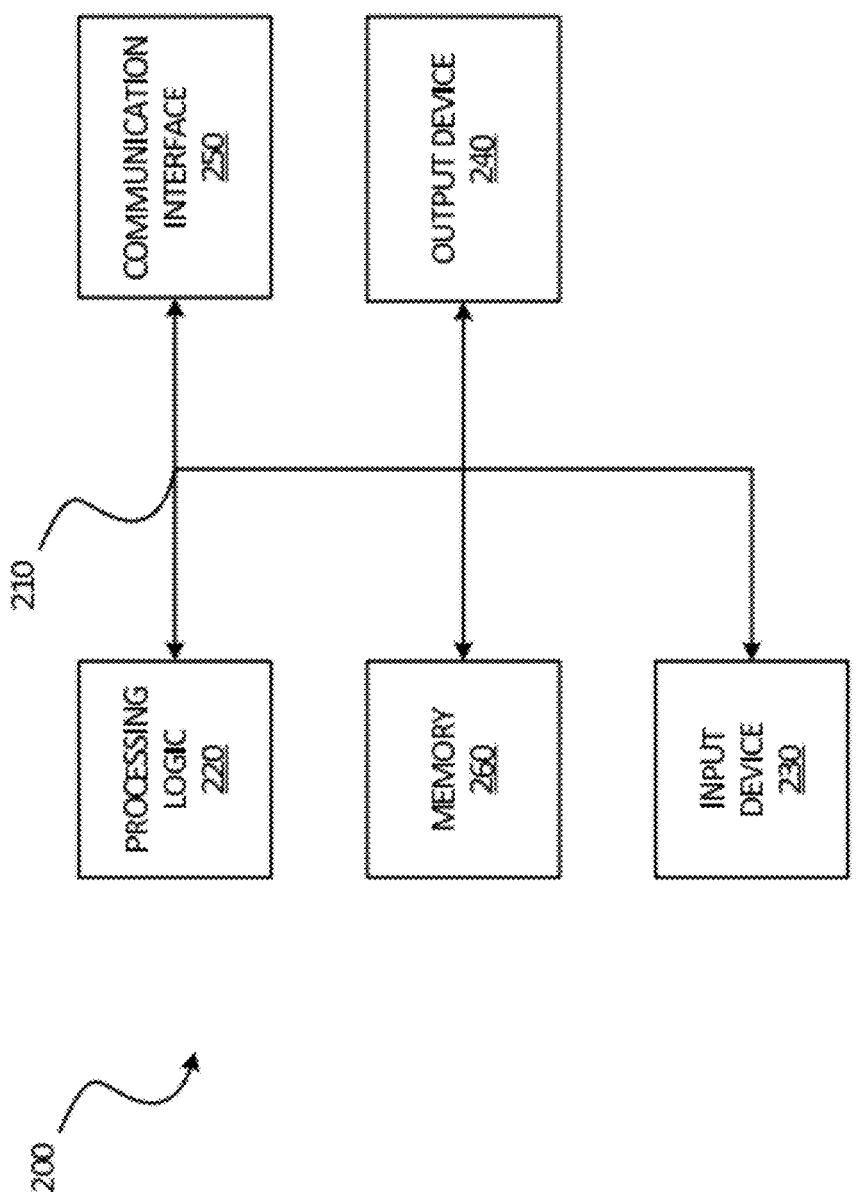

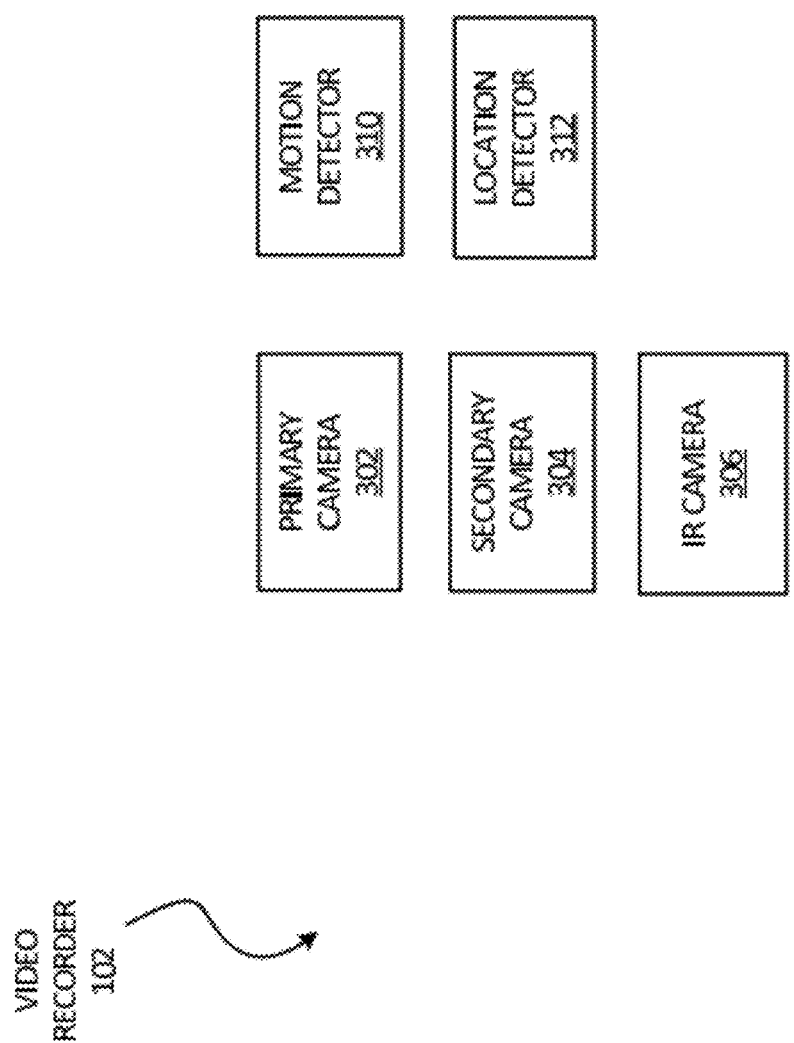

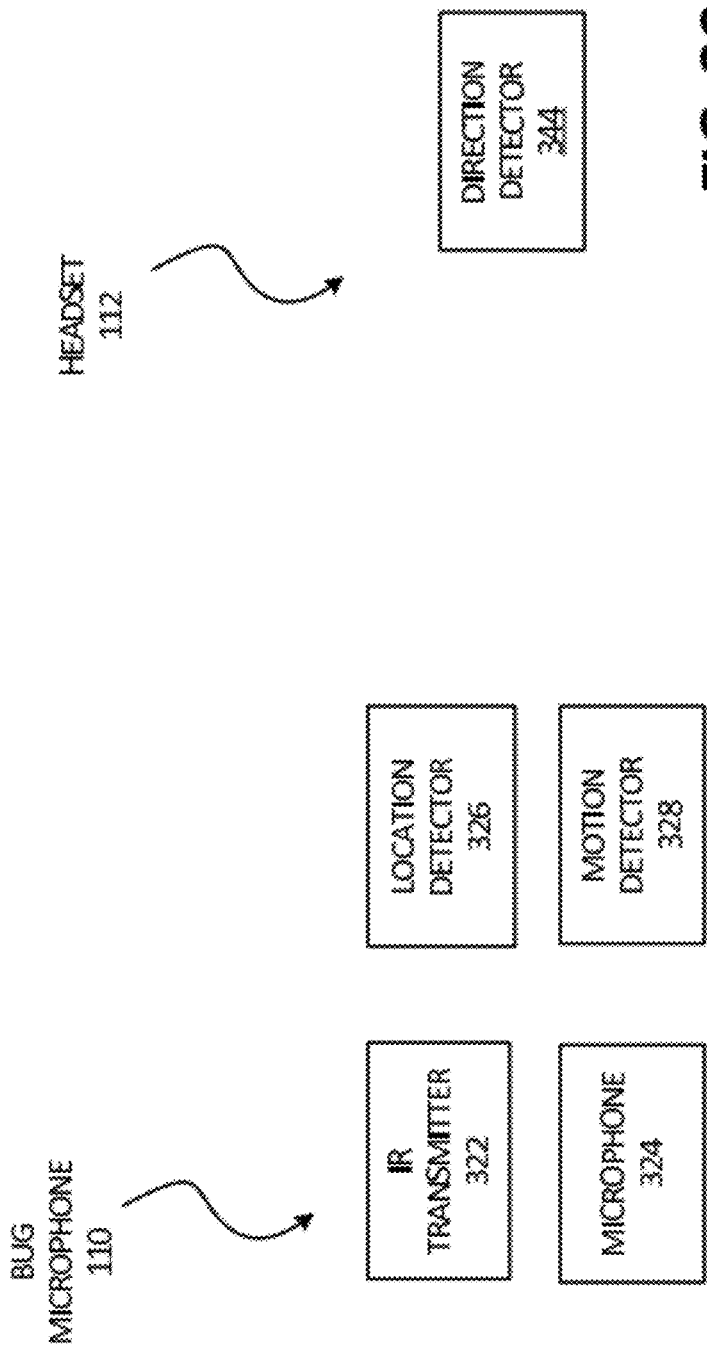

SENSOR-BASED PLACEMENT OF SOUND IN VIDEO RECORDING

BACKGROUND

The set of a recording studio or the set of a movie may include numerous microphones that generate numerous audio recordings. For example, each person on the set may have a "bug microphone" that records his or her speech. Thus, these multiple audio recordings are generated in addition to the associated video recording. After recording, the audio recordings may be processed to generate audio channels for reproduction (e.g., playback for the enjoyment of an audience). The processing may generate surround sound audio channels (e.g., "5.1" audio channels), two channels for stereo or synthesized binaural sound, etc. Thus, the person watching a recorded video may perceive sound coming from the direction of the speakers. This audio processing may require an operator to enter the location of audio sources, for example, by tediously selecting points in the frames of the corresponding video.

SUMMARY

In one aspect of an embodiment, a method may include receiving video recorded with a camera and audio recorded with a microphone. The video and audio may have been recorded simultaneously, and the microphone may move relative to the camera. The method may also include receiving a selection from a user of an object in the video. The object may be collocated with the microphone that recorded the audio. The method may also include tracking the object in the video and determining a location over time of the microphone relative to the camera based on the tracking of the object.

In one aspect, the method may include processing the recorded audio to generate additional or modified audio channels based on the location of the microphone determined by tracking the object.

In one aspect, the method may include generating surround-sound audio channels, or generating head-related transfer function audio channels. In one aspect, the method may include recording motion information related to motion of the microphone while recording the audio with the microphone. Tracking the object in the video may include using the motion information related to the microphone. In one aspect, the method may include recording motion information related to motion of the camera while recording the video with the camera. Tracking the object in the video may include using the motion information related to the camera.

In one aspect, the method may include receiving video recorded with a camera and audio recorded with a microphone. The video and audio may have been recorded simultaneously during a time period. The microphone may move relative to the camera. The method may include receiving location information indicative of the location of the microphone relative to the camera. The location information may be captured simultaneously with the recording of the video and audio. The method may include determining the location of the microphone relative to the camera over the time period based on the received location information. The method may include processing the recorded audio to generate additional or modified audio channels based on the location of the microphone determined by tracking the object.

In one aspect, the method may include receiving first absolute location information indicative of an absolute location of the camera over the time period. The method may include receiving second absolute location information indicative of an absolute location of the microphone over the time period. The location information may include the first absolute location information and the second absolute location information. The method may include determining the location of the microphone relative to the camera over the time period based on the first absolute location information and the second absolute location information. In one aspect, the first absolute location information or the second absolute location information may include global position system (GPS) information.

In one aspect, the method may include receiving direction information indicative of the direction of the camera. Determining the location of the microphone relative to the camera may include determining the location of the microphone relative to the camera based on the direction information.

In one aspect, the camera is a first camera. The method may include receiving a recording, captured by a second camera, of a beacon light over the time period. The location information may include the recording of the beacon light. The beacon light may be collocated with the microphone. The method may include determining the location of the microphone relative to the camera over the time period based on the recording of the beacon light over the time period. In one aspect, the beacon light may include infra-red (IR) light and the second camera may include an IR camera.

In one aspect, the method may include generating surround-sound audio channels, generating stereo audio channels, or generating head-related transfer function audio channels.

In one aspect, the method may include receiving motion information related to motion of the microphone over the time period. Determining the location of the microphone relative to the camera may include the determining the location based on the motion information related to the motion of the microphone.

In one aspect, the method may include receiving motion information related to motion of the camera over the time period. Determining the location of the microphone relative to the camera may include the determining the location based on the motion information related to the motion of the camera.

In one aspect, the method may include receiving video recorded with a camera, audio recorded with a microphone, and information indicative of a focus of an operator of the camera. The video, audio, and information indicative of the operator may have been recorded simultaneously during a time period, and the microphone may move relative to the camera. The method may include determining a location of the microphone relative to the camera over the time period based on the information indicative of the focus of the operator of the camera. The method may include processing the recorded audio to generate additional or modified audio channels based on the location of the microphone determined by tracking the object.

In one aspect, the method may include received video is a first received video and the camera is a first camera. Receiving the information indicative of the focus of an operator may include receiving a second video of the operator from a second camera recorded simultaneously with the first video. The second camera may be in a known location relative to the first camera. The method may include determining the focus of the operator of the camera based on the second video of the operator from the second camera. In one aspect, the first camera and the second camera may face opposite directions.

In one aspect, the method may include receiving first direction information indicative of the direction of a headset worn by the operator of the camera. Determining the location of the microphone relative to the camera may include determining the location of the microphone relative to the camera based on the first direction information.

In one aspect, the method may include receiving second direction information indicative of the direction of the camera. Determining the location of the microphone relative to the camera may include determining the position of the microphone relative to the camera based on the second direction information.

In one aspect, the method may include generating surround-sound audio channels, generating stereo audio channels, or generating head-related transfer function audio channels.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIG. 2 is a block diagram of an exemplary computing module that may be included in the devices shown in FIGS. 1A and 1B;

FIG. 3A is a block diagram of exemplary functional and/or structural components of the video recorder of FIG. 1A;

FIG. 3B is a block diagram of exemplary functional and/or structural components of the bug microphone of FIG. 1A;

FIG. 3C is a block diagram of exemplary functional and/or structural components of the headset of FIG. 1A;

DETAILED DESCRIPTION

The following detailed description refers to the accompanying drawings. The same reference numbers in different drawings may identify the same or similar elements.

As discussed above, audio recordings (or even a single audio recording) may be processed to generate audio channels for reproduction. In some instances, such signal processing may be based on the location of the microphone relative to the video camera (e.g., direction and/or distance) during the recording of the video and audio. For example, if the microphone is to the right of the camera, then this information may be used to generate an audio channel such that the sound appears to come from the right during subsequent reproduction of the audio and video. Thus, embodiments disclosed allow for the determination of the location of microphones relative to a camera for the generation or modification of audio channels for reproduction. The additional or modified audio channels may include audio channels for stereo sound, surround sound, etc.

Figure 1A:
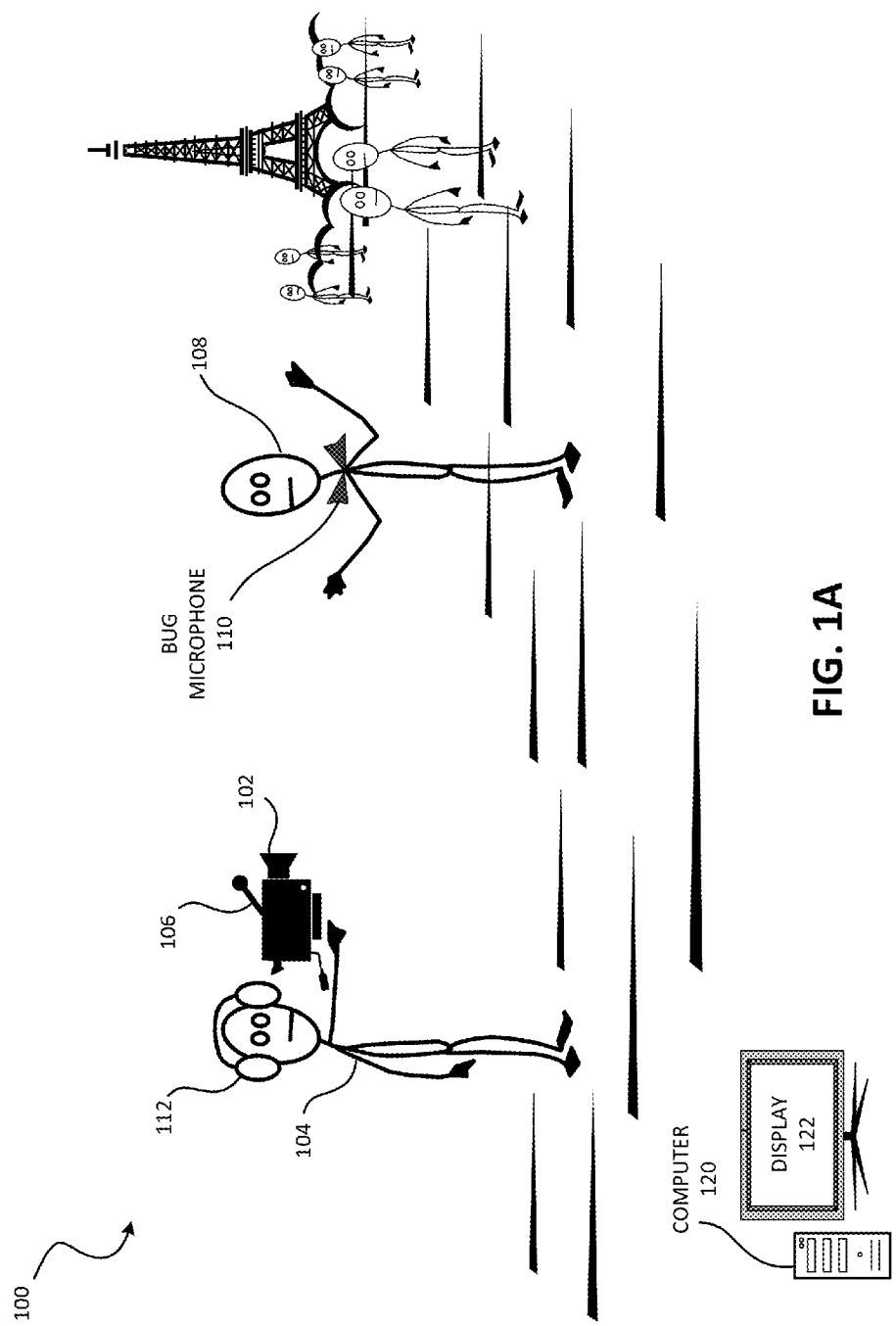
FIG. 1A is a diagram of an exemplary environment in which embodiments disclosed herein may be implemented.

FIG. 1A is a block diagram of an exemplary environment 100 in which embodiments described herein may be implemented. Environment 100 may include a video recorder 102, an operator 104 (who may be wearing a headset 112), a microphone 106, a subject 108, and/or a bug microphone 110. Environment 100 may also include a computer 120 associated with a display 122.

Video recorder 102 may include a camera and/or a microphone (such as microphone 106) to capture video and/or audio and may store the video and audio in video recorder 102 or remotely (e.g., in computer 120). Video recorder 102 may include a camcorder. In one embodiment, video recorder 102 may include multiple cameras and/or multiple microphones. Although shown attached to video recorder 102, microphone 106 may be placed anywhere in environment 100. Microphone 106 may capture sound (e.g., ambient and other sound) in environment 100. In one embodiment, microphone 106 may include a directional microphone.

Operator 104 may operate video recorder 102 to capture video of subject 108 (e.g., a person). Subject 108 may wear a bug microphone 110 to capture audio (e.g., speech) from subject 108 and surrounding sounds. A bug microphone may also be referred to as a "point source microphone," a "source microphone," or just a "microphone." Operator 104 may wear headset 112, which, as described in more detail below, may indicate the direction that the operator is looking.

Computer 120 may include one or more computer systems for hosting programs, databases, and/or applications. Computer 120 may include a laptop, desktop, notebook, netbook, internet tablet or any other type of computing device. Computer 120 may include application programs, such as an application for processing audio captured by microphones (microphone 106 and/or bug microphone 110). The application may process the audio for later reproduction by users while the users are watching the associated video, for example. The application may employ display 122 to present video and menu options to a user, for example.

Environment 100 may include a movie set (e.g., in Paris) with many actors (e.g., such as subject 108) and background city noise. Environment 100 may include a studio with a single speaker or a few speakers (e.g., such as subject 108).

Figure 1B:
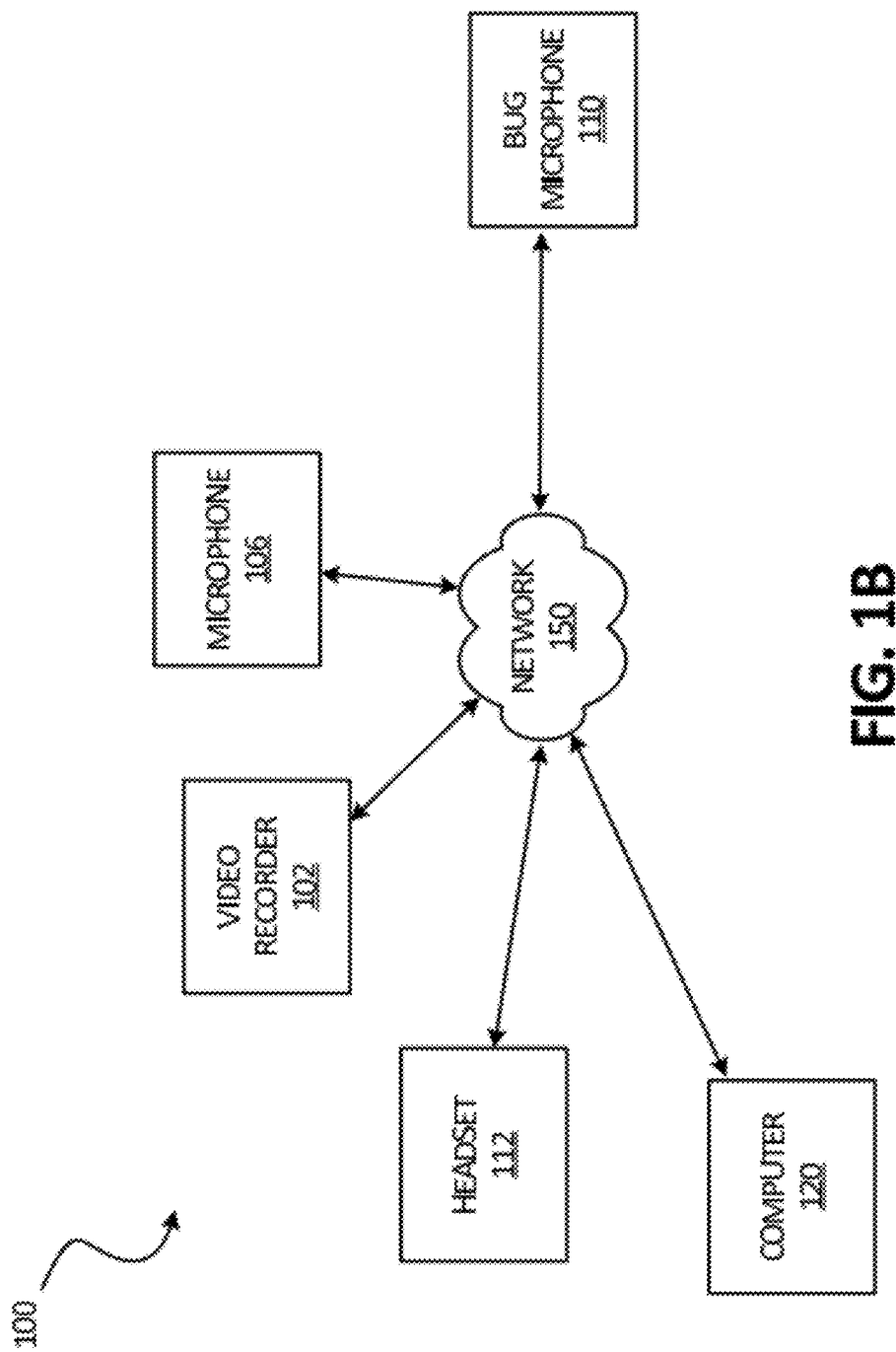
FIG. 1B is a block diagram of the exemplary environment of FIG. 1A in a network.

FIG. 1B shows the devices in environment 100 connected to a network 150. Network 150 allows devices in environment 100 to communicate with each other. Network 150 may include one or more networks that implement the Internet Protocol (IP), Ethernet protocol, or other protocols. Network 150 may include one or more networks of various types, including a wireless public land mobile network (PLMN) (e.g., a Global System for Mobile Communications (GSM) PLMN, a Long Term Evolution (LTE) PLMN, etc.). Network 150 may include a local area network (LAN), a wide area network (WAN), a metropolitan area network (MAN), an intranet, the Internet, or a cable network (e.g., an optical cable network).

In some embodiments, devices in environment 100 may communicate directly with each other without network 150. For example, in one embodiment, bug microphone 110 may communicate with video recorder 102 via a radio-frequency (RF) link (e.g., a 2.4 GHz link), Bluetooth, a cable (e.g., a USB cable), etc. Although FIG. 1B shows devices coupled to network 150 in a particular configuration, these devices may also be arranged in other configurations, either coupling directly with each other or through one or more networks, such that any one of the devices in environment 100 may communicate with any other one of devices.

Environment 100 illustrated in FIGS. 1A and 1B is provided for simplicity. In other embodiments, environment 100 may include more, fewer, different, or a different arrangement of devices. For example, environment 100 may include more than one subject 108 (e.g., dozens of subjects), more than one bug microphone 110 (e.g., a bug microphone for each subject), more than one video recorder 102, more than one microphone 106, etc.

Each of the devices in environment 100 may include a computing module. FIG. 2 is a block diagram of exemplary components of a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 may include a path that permits communication among the components of computing module 200. Processing logic 220 may include any type of processor or microprocessor (e.g., a dual-core processor or multiple processors) that interprets and executes instructions. In other embodiments, processing logic 220 may include an application-specific integrated circuit (ASIC), a field-programmable gate array (FPGA), etc.

Input device 230 may allow a user to input information into computing module 200. Input device 230 may include a keyboard, a mouse, a pen, a microphone, a remote control, an image camera for capturing images, a video camera for capturing video, a touch-screen display, etc. In the case of computer 120, input device 230 may include a keyboard (not shown) and a touch screen display (e.g., display 122). In the case of video recorder 102, input device 230 may include buttons, a touch-screen display, and a microphone (e.g., microphone 106). In the case of bug microphone 110, input device 230 may include an on/off switch and a microphone.

Output device 240 may output information to the user. Output device 240 may include a display, a printer, a speaker (e.g., surround-sound speakers), headphones, etc. For example, computer 120 may use display 122 as output device 240, which may include a liquid-crystal display (LCD) for displaying content to the user. As another example, video recorder 102 may include light-emitting diodes (LEDs).

Input device 230 and output device 240 may allow a user to activate and interact with a particular service or application. Input device 230 and output device 240 may allow a user to receive and view a menu of options and select from the menu options. The menu may allow the user to select various functions or services associated with applications executed by computing module 200. For example, an application in video recorder 102 may allow the user to start and stop video recording, select recording options, etc. As another example, an application in computer 120 may process recorded audio (e.g., captured by environment 100 and/or microphone 106) to generate audio channels for reproducing. Input device 230 and output device 240 may allow the user to select options in the application for generating audio channels.

Communication interface 250 may include a transceiver that enables computing module 200 to communicate with other devices or systems. Communication interface 250 may include a transmitter that converts baseband signals to radio frequency (RF) signals or a receiver that converts RF signals to baseband signals. Communication interface 250 may be coupled to an antenna for transmitting and receiving RF signals. Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface, a radio-frequency identification (RFID) interface, a near-field communications (NFC) wireless interface, etc.

Memory 260 may store, among other things, information and instructions (e.g., applications and an operating system) and data (e.g., recorded video, recorded audio, generated audio channels, position data of bug microphone 110 relative to video recorder 102, etc.) for use by processing logic 220. Memory 260 may include a random access memory (RAM) or another type of dynamic storage device, a read-only memory (ROM) device or another type of static storage device, and/or some other type of magnetic or optical recording medium and its corresponding drive (e.g., a hard disk drive).

Memory 260 may store an operating system, applications, and/or application data. The operating system may include software instructions for managing hardware and software resources of computing module 200. For example, the operating system may include Linux, Solaris, Windows, OS X, iOS, Android, an embedded operating system, etc. An application may include, in the case of computer 120, an application to input recorded audio data to generate audio channels for reproduction to a user to enhance a user's experience.

Computing module 200 may perform the operations described herein in response to processing logic 220 executing software instructions stored in a computer-readable medium, such as memory 260. A computer-readable medium may include a tangible, non-transient, physical, and/or logical memory device. The software instructions may be read into memory 260 from another computer-readable medium or from another device via communication interface 250. The software instructions stored in memory 260 may cause processing logic 220 to perform processes that are described herein.

As discussed above, video recorder 102 may capture video and/or audio and may store the video and audio in video recorder 102 (e.g., in memory 260 of video recorder 102 or computer 120). FIG. 3A is a block diagram of exemplary functional (e.g., program instructions stored in memory 260) and/or structural components of video recorder 102. Video recorder 102 may include a primary camera 302, a secondary camera 304, an infra-red (IR) camera 306, a motion detector 310, a location detector 312, and/or microphone 106. Video recorder 102 may include more, fewer, different, or a different arrangement of components than shown in FIG. 3A.

Primary camera 302 may capture images or video of objects, such as images or video of subject 108. Secondary camera 304 may also capture images or video of objects but, in one embodiment, in a different direction than primary camera 302. For example, secondary camera 304 may capture images or video of operator 104 as operator 104 is using video recorder 102 to capture video of subject 108. In another embodiment, secondary camera 304 may capture images or video of an audience (not shown) that is watching subject 108. Images from secondary camera 304 may be used to determine the focus of operator 104 (e.g., determine where operator 104 is looking).

IR camera 306 may capture images or video of light sources in the IR spectrum. In this embodiment, for example, bug microphone 110 may include a transmitter or a beacon of IR light (e.g., a light-emitting diode or LED). IR camera 306 may capture video or images of the IR light emitted from the LED. In one embodiment, the direction of IR camera 306 may be known relative to (e.g., match) the direction of primary camera 302. In another embodiment, the focal point of IR camera 306 may be known relative to (e.g., match) the focal point of primary camera 302 (e.g., both cameras may be configured to focus on an object at the same distance away from video recorder 102). In this way, IR light sources may be associated with directions and distances of audio sources (e.g., subject 108 wearing bug microphone 110) also captured by primary camera 302. In another embodiment, video recorder 102 does not include IR camera 306. Rather, IR camera 306 is in a known location relative to video recorder 102 (e.g., next to IR camera 306).

The angular resolution of IR camera 306, in one embodiment, may match or correspond (e.g., approximately) to the angular resolution of the human ear (e.g., in both azimuth and elevation). For example, if the human ear can discern two different point sources of sound that are spaced 3 degrees apart in azimuth, then IR camera 306 may have a corresponding resolution to discern two IR light sources 3 degrees apart. If the human ear cannot discern two different point sources of sound that are spaced 1 degree apart, then IR camera 306 may dispense with the added hardware necessary to discern two IR light sources 1 degree apart. In one embodiment, IR camera 306 may cover a larger volume than primary camera 302. For example, IR camera 306 (which may include more than one camera) may cover 360 degrees of azimuth even though primary camera 302 may only cover 45 degrees of azimuth. In one embodiment, frequencies other than IR frequencies may be used (e.g., radio frequencies).

Motion detector 310 may measure the direction and/or motion (e.g., relative motion) of video recorder 102. Motion detector 310 may include an accelerometer (e.g., a microelectromechanical system or MEMS accelerometer) to measure movement or acceleration. Motion detector 310 may include a gyroscope (e.g., a MEMS gyroscope) to measure rotation or orientation. Motion detector 310 may also include a compass (e.g., using the Hall effect) to measure direction. The direction of motion detector 310 may correspond to the direction of the camera capturing images or video in video recorder 102, for example. In one embodiment, data from motion detector 310 may assist in determining the location of objects in environment 100 (e.g., bug microphone 110) relative to video recorder 102.

Location detector 312 may determine or collect information to determine the location or position of video recorder 102 (e.g., the position of video recorder 102 on the earth). Location detector 312 may include a Global Positioning System (GPS) device. As a GPS device, location detector 312 may receive signals from satellites to determine the location (e.g., absolute position) of video recorder 102. As used herein, "absolute position" or "absolute location" means a position relative to a frame of reference other than primary camera 302 (e.g. a position relative to the earth such as determined by GPS). Location detector 312 may also use other location systems or methods, such as a system that determines the location of video recorder 102 relative to hotspots or cell towers and then determines the location of video recorder 102 based on known locations of the hotspots or cell towers. In one embodiment, data from location detector 312 may assist in determining the location of objects in environment 100 (e.g., bug microphone 110) relative to video recorder 102.

Although video recorder 102 is described as including IR camera 306, motion detector 310, and/or location detector 312, in another embodiment, these components may simply be collocated with video recorder 102 (e.g., coupled to video recorder 102 or in a known position relative to video recorder 102) rather than being part of video recorder 102. In one embodiment, video recorder 102 may time stamp the information from primary camera 302, secondary camera 304, IR camera 306, motion detector 310, and/or location detector 312 sent to computer 120.

As discussed above, subject 108 may wear a bug microphone 110 to capture audio (e.g., speech) from subject 108 and surrounding audio. Environment 100 may include multiple subjects (like subject 108) wearing a bug microphone (like bug microphone 110). FIG. 3B is a block diagram of exemplary functional (e.g., program instructions stored in memory 260) and/or structural components of bug microphone 110. Bug microphone 110 may include an IR transmitter 322, a microphone 324, a location detector 326, and/or a motion detector 328. Bug microphone 110 may include more, fewer, different, or a different arrangement of components than shown in FIG. 3B.

IR transmitter 322 may include an LED to transmit light at, for example, IR frequencies. In one embodiment, IR transmitter 322 may transmit pulses of light periodically (e.g., every 10 ms, 20 ms, 50 ms, 80 ms, 100 ms, 200 ms, 500 ms, 700 ms, 1 second, 2 seconds, etc.). In one embodiment, IR transmitter 322 may modulate (e.g., pulse) in a pattern so as to uniquely identify IR transmitter 322. In one embodiment, frequencies other than IR frequencies may be used (e.g., radio frequencies).

Location detector 326 may determine or collect information to determine the location of bug microphone 110 (e.g., the absolute position of bug microphone 110). Location detector 326 may include a GPS device. As a GPS device, location detector 326 may receive signals from satellites to determine the location (e.g., absolute position) of bug microphone 110 (e.g., relative to the earth). Location detector 326 may also use other location systems or methods, such as a system that determines the location of video recorder 102 relative to hotspots or cell towers and then determines the location of video recorder 102 based on known locations of the hotspots or cell towers. Location detector 326 may transmit location information to video recorder 102 (or computer 120) for association with video being recorded by video recorder 102.

Motion detector 328 may measure the direction and/or motion (e.g., relative motion) of bug microphone 110. Motion detector 328 may include an accelerometer (e.g., a MEMS accelerometer) to measure movement or acceleration. Motion detector 310 may include a gyroscope (e.g., a MEMS gyroscope) to measure rotation or orientation. Motion detector 328 may also include a compass (e.g., using the Hall effect) to measure direction. In one embodiment, data from motion detector 310 may assist in tracking bug microphone 110 relative to other objects in environment 100 (e.g., video recorder 102). Motion detector 328 may transmit motion information to, for example, video recorder 102 or computer 120 for association with video being recorded by video recorder 102.

Microphone 324 may capture sound (e.g., from subject 108 and/or ambient sound) in environment 100. Bug microphone 110 may send the captured sound information to video recorder 102 or computer 120, for example. Environment 100 may include multiple subjects 108, each with a different bug microphone 110 including a microphone 324 to capture sound.

Although bug microphone 110 is described as including IR transmitter 322, location detector 326, and motion detector 328, in another embodiment, IR transmitter 322, location detector 326, and/or motion detector 328 may simply be collocated with bug microphone 110 (e.g., coupled to the same object 108) rather than being part of bug microphone 110. In one embodiment, bug microphone 110 may time stamp the information from microphone 324, location detector 326, and/or motion detector 328 sent to video recorder 102 or computer 120.

As discussed above, operator 104 may wear headset 112 for determining the focus of operator 104 (e.g., the direction operator 104 is looking). FIG. 3C is a block diagram of exemplary functional (e.g., program instructions stored in memory 260) and/or structural components of headset 112. Headset 112 may include a direction detector 344. Direction detector 344 may measure the direction of headset 112 (e.g., the direction that operator 104 is looking). Direction detector 344 may include an accelerometer (e.g., a MEMS accelerometer) to measure movement or acceleration. Direction detector 344 may include a gyroscope (e.g., a MEMS gyroscope) to measure rotation or orientation. Motion detector 310 may also include a compass (e.g., using the Hall effect) to measure direction. In one embodiment, it may be assumed that the direction of headset 112 corresponds to the direction that operator 104 is looking, which in turn corresponds to the direction of the sound being captured by bug microphone 110.

Headset 112 may include more, fewer, different, or a different arrangement of components than shown in FIG. 3C. For example, headset 112 may include eyeglasses with two colored spots readily captured by a camera (e.g., secondary camera 304) and processed by an image processor. Thus, the colored spots on headset 112 may allow for the determination of the direction that operator 104 is looking. In another embodiment, headset 112 may include eyeglasses with two IR transmitters. The IR light may be captured by a camera (e.g., a rearward facing IR camera) and processed by an image processor. Thus, the IR lights on headset 112 may allow for the determination of the direction that operator 104 is looking. In another embodiment, headset 112 may include a camera to capture the direction that operator 104 is looking. In one embodiment, headset 112 may time stamp the information from direction detector 344 sent to video recorder 102 and/or computer 120.

Figure 3D:
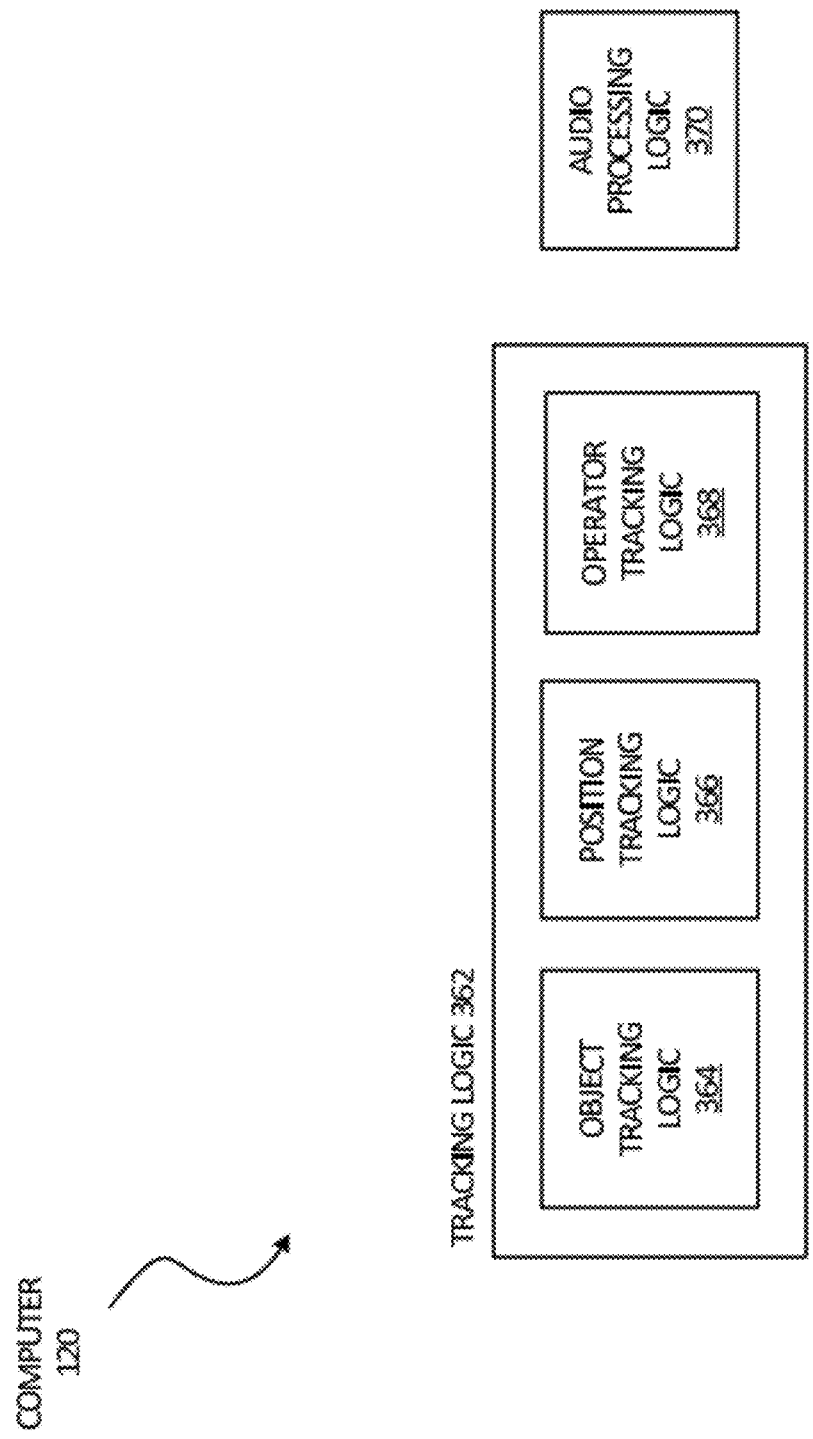
FIG. 3D is a block diagram of exemplary functional and/or structural components of the computer of FIG. 1A.

As discussed above, computer 120 may include an application for processing the audio captured by a microphone (e.g., bug microphone 110 and/or microphone 106) to generate or modify audio channels for reproduction. Computer 120 may also include an application to receive inputs from video recorder 102, bug microphone 110, and/or headset 112 to determine the position of bug microphone 110 relative to video recorder 102. FIG. 3D is a block diagram of exemplary functional (e.g., program instructions stored in memory 260) and/or structural components of computer 120. Computer 120 may include tracking logic 362 and audio processing logic 370. Tracking logic 362 may include object tracking logic 364, position tracking logic 366, and/or operator tracking logic 368.

Tracking logic 362 may use different inputs to track bug microphone 110 relative to primary camera 302. For example, tracking logic 362 may determine the location of bug microphone 110 relative to primary camera 302 (e.g., relative to the plane of the aperture of primary camera 302). For example, tracking logic 362 may determine the direction (e.g., azimuth and elevation) of bug microphone 110 relative to primary camera 302. In one embodiment, tracking logic 362 may also determine the distance between bug microphone 110 and primary camera 302.

Audio processing logic 370 may use the tracking information to modify or create audio channels for reproduction at a later time. For example, audio processing logic 370 may use algorithms to generate surround sound audio channels (front left, front right, front center, rear left, rear right, and base). In another example, audio processing logic 370 may use a head-related transfer function (HRTF) to generate channels (e.g., left and right) that simulate sound arriving from a particular direction. Audio processing logic 370 may also generate stereo audio channels. Thus, when a user watches the recorded video and listens to the associated audio channels, his or her experience may be enhanced. In other words, the user may perceive sound coming from the direction of bug microphone 110 relative to the image captured by video recorder 102.

Figure 4:
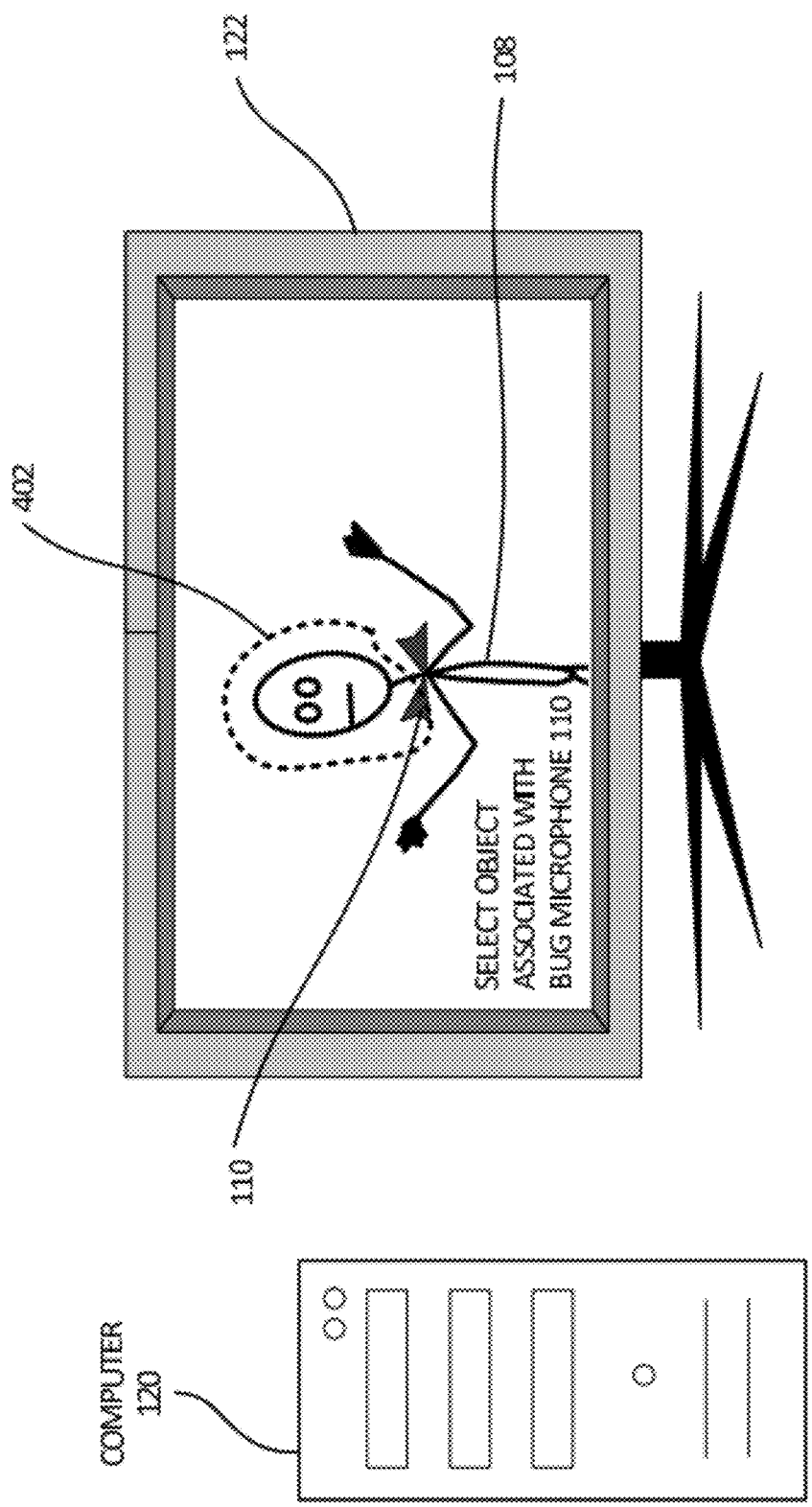
FIG. 4 is a block diagram of the exemplary computer and display of FIG. 1A allowing a user to select an object for tracking.

Object tracking logic 364 may determine the location of bug microphone 110 relative to primary camera 302 by allowing a user to select an object in a video frame that is associated with bug microphone 110. For example, as shown in FIG. 4, after recording subject 108 with bug microphone 110, computer 120 may play the video on display 122. The user may select an object (e.g., the head of subject 108) associated with bug microphone 110. In one embodiment, display 122 is a touch screen and the user may select the object by touching or circling the selected object. Display 122 shows a dashed line 402 created when, for example, the user encircles the head of subject 108. The user may also select the recorded audio channel associated with the object, e.g., the audio channel from bug microphone 110, in case there are multiple bug microphones present in environment 100. In one embodiment, object tracking logic 364 may use information from bug microphone 110 (e.g., location detector 326 and/or motion detector 328) or from video recorder 102 (e.g., motion detector 310 and/or location detector 312) to help track objects in recorded video. In one embodiment, object tracking logic 364 may determine the distance of the selected object from focus information stored by video recorder 102, for example.

Returning to FIG. 3D, position tracking logic 366 may track the position of bug microphone 110 relative to primary camera 302 based on information from, for example, video recorder 102 (e.g., motion detector 310 and/or location detector 312) and/or bug microphone 110 (e.g., location detector 326 and/or motion detector 328). For example, position tracking logic 366 may use the absolute location of video recorder 102 (e.g., using GPS), the direction of primary camera 302 (e.g., using a compass), and the absolute location of bug microphone 110. Using this information, position tracking logic 366 may determine the location of bug microphone 110 relative to primary camera 302.

In one embodiment, position tracking logic 366 may use information from IR camera 306 and primary camera 302. In this embodiment, IR transmitter 322 in bug microphone 110 may transmit IR light that IR camera 306 detects in a frame. Based on the known position of IR camera 306 relative to a frame of primary camera 302, position tracking logic 364 may determine the location of bug microphone 110 relative to primary camera 302. In one embodiment, position tracking logic 366 may determine the distance of bug microphone 110 from video recorder 102 by the intensity or power of the IR light received by IR camera 306.

In yet another embodiment, position tracking logic 366 may use information from motion detector 328 in bug microphone 110 (e.g., acceleration, orientation, etc.) and/or motion detector 310 in video recorder 102 (e.g., acceleration, orientation, etc.) to determine or help determine the location of bug microphone 110 relative to primary camera 302.

Operator tracking logic 368 may track the focus (e.g., the direction of the eyes and/or the direction of the head) of operator 104. In this embodiment, it is assumed that operator 104 will focus on the location of the bug microphone 110 (or the location of the bug microphone in environment 100 that at any time is the primary source of audio). Operator tracking logic 368 may use information from headset 112 to determine the focus of operator 104. For example, in one embodiment, operator tracking logic 368 may use information from direction detector 344 to determine the focus of operator 104. In another embodiment, operator tracking logic 368 may track the eyes of operator 104 from video captured from secondary camera 304 or from a camera in headset 112. In another embodiment, operator tracking logic 368 may track colored dots on headset 112 (e.g., in the form of eyeglasses) worn by operator 104. In another embodiment, operator tracking logic 368 may track the eyes of other people in environment 100, such as the live audience listening to subject 108.

In one embodiment, tracking logic 362 may determine the distance between bug microphone 110 and video recorder 102 by measuring the difference of intensity between sound received by environment 100 and the same sound received by microphone 106.

Computer 120 may include more, fewer, different, or a different arrangement of components than shown in FIG. 3D. For example, in one embodiment, tracking logic 362 may employ any sub-combination of logic 364-368. That is, tracking logic 362 may employ object tracking logic 364 without position tracking logic 366 or operator tracking logic 368; position tracking logic 366 without object tracking logic or operator tracking logic 368; or operator tracking logic 368 without object tracking logic 364 or position tracking logic 366; etc. Further, any component of video recorder 102 may perform the functions described as being performed by any other component of video recorder 102.

Exemplary Processes

Figure 5A:
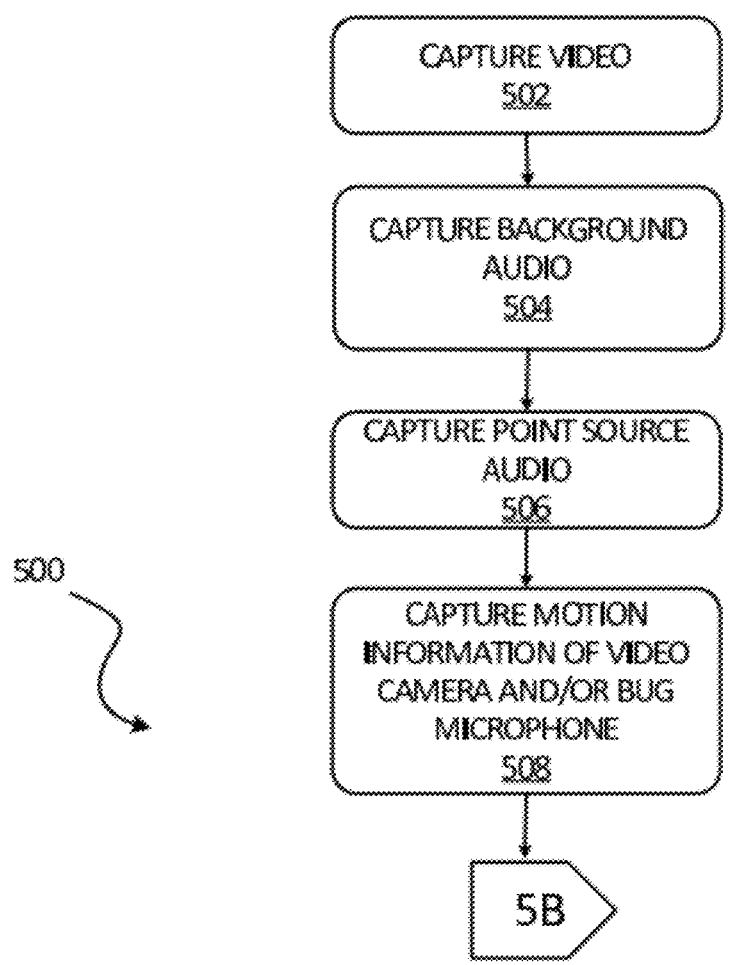
FIGS. 5A through 7B are flowcharts of exemplary processes for determining the location of the bug microphone relative to the video recorder of FIG. 1A for the modification or generation of additional audio channels.
Figure 5B:
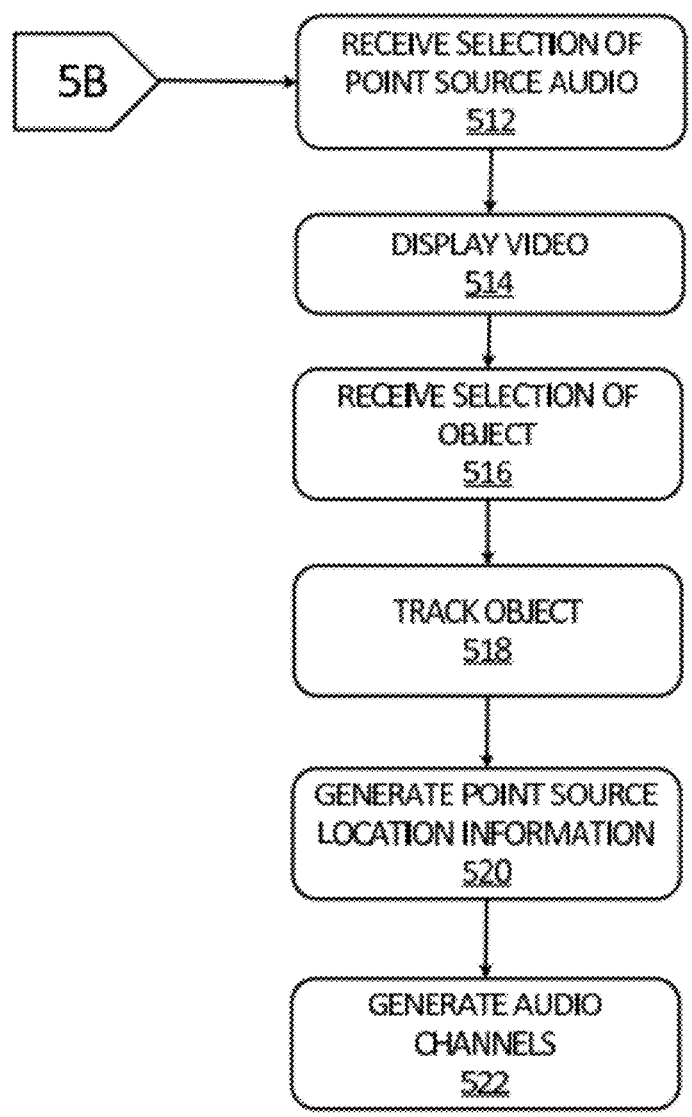

FIGS. 5A and 5B are flowcharts of an exemplary process 500 for capturing video and audio and determining the location of bug microphone 110 relative to video recorder 102. This relative location information may be used for enriching the sound reproduction quality of the captured audio. Process 500 is described with respect to environment 100 of FIG. 1A, in which operator 104 uses video recorder 102 having microphone 106 to capture video of subject 108 wearing bug microphone 110.

Process 500 begins with the capture of video (block 502). In the example of FIG. 1A, primary camera 302 of video recorder 102 captures video of subject 108. The video may be stored in video recorder 102 or transmitted to computer 120 for storage, for example. Background audio may also be captured (block 504). In one embodiment (e.g., where there is background noise, such as in a tourist location), microphone 106 may capture the ambient sound. As discussed above, microphone 106 may be located on video recorder 102 or located elsewhere in environment 100. In another embodiment (e.g., where there is little background noise), recording audio with microphone 106 may be omitted. Point source audio may also be captured (block 506). In environment 100, bug microphone 110 captures point source audio, which includes subject 108 talking, for example.

Motion information of the video camera and/or bug microphone may be captured (block 508). In this embodiment, location detector 326 may detect, for example, the acceleration and/or orientation of bug microphone 110. The motion information may be transmitted from bug microphone 110 to video recorder 102 or computer 120 for storage. Further, motion detector 310 may detect, for example, the acceleration and/or orientation of video recorder 102. The motion information may be stored in video recorder 102 or transmitted to computer 120 for storage. The motion information from bug microphone 110 and/or video recorder 102 may be used, as discussed below, to enhance the tracking of objects being recorded by video recorder 102, although the capture of motion information is optional for tracking objects. In another embodiment, motion information of video recorder 102 and/or bug microphone 110 is not captured.

Process 500 may continue to block 512 shown in FIG. 5B. The rest of process 500 may be considered "post processing," in that it may take place after the recording of video and audio. Nonetheless, in one embodiment, the post processing described may occur during the capture of audio and video for real-time streaming, for example.

In the case where multiple audio sources (e.g., point sources) are recorded (e.g., from multiple bug microphones such as bug microphone 110), a selection of the point source may be received from the user (block 512). For example, the user may select the sound recorded by bug microphone 110. In this example, display 122 may display the captured video (block 514) and computer 120 may receive a selection of an object associated with the audio source (block 516). For example, as described above, the user may select the head of subject 108 as the object associated with bug microphone 110. Thus, as subject 108 moves relative to primary camera 302 in video recorder 102, object tracking logic 364 in computer 120 may track the head of subject 108 (block 518). Object tracking logic 364 may use motion information from bug microphone 110 and/or video recorder 102 to track objects in captured video. Object tracking logic 364 may generate point source location information (block 520). For example, object tracking logic 364 may output the location of bug microphone 110 relative to primary camera 302. The location information may include direction (e.g., azimuth and/or elevation) and/or distance over a period of time.

The point source location information may be input into audio processing logic for the generation or modification of audio channels (block 522) to enhance the user experience while watching the recorded video.

Figure 6A:
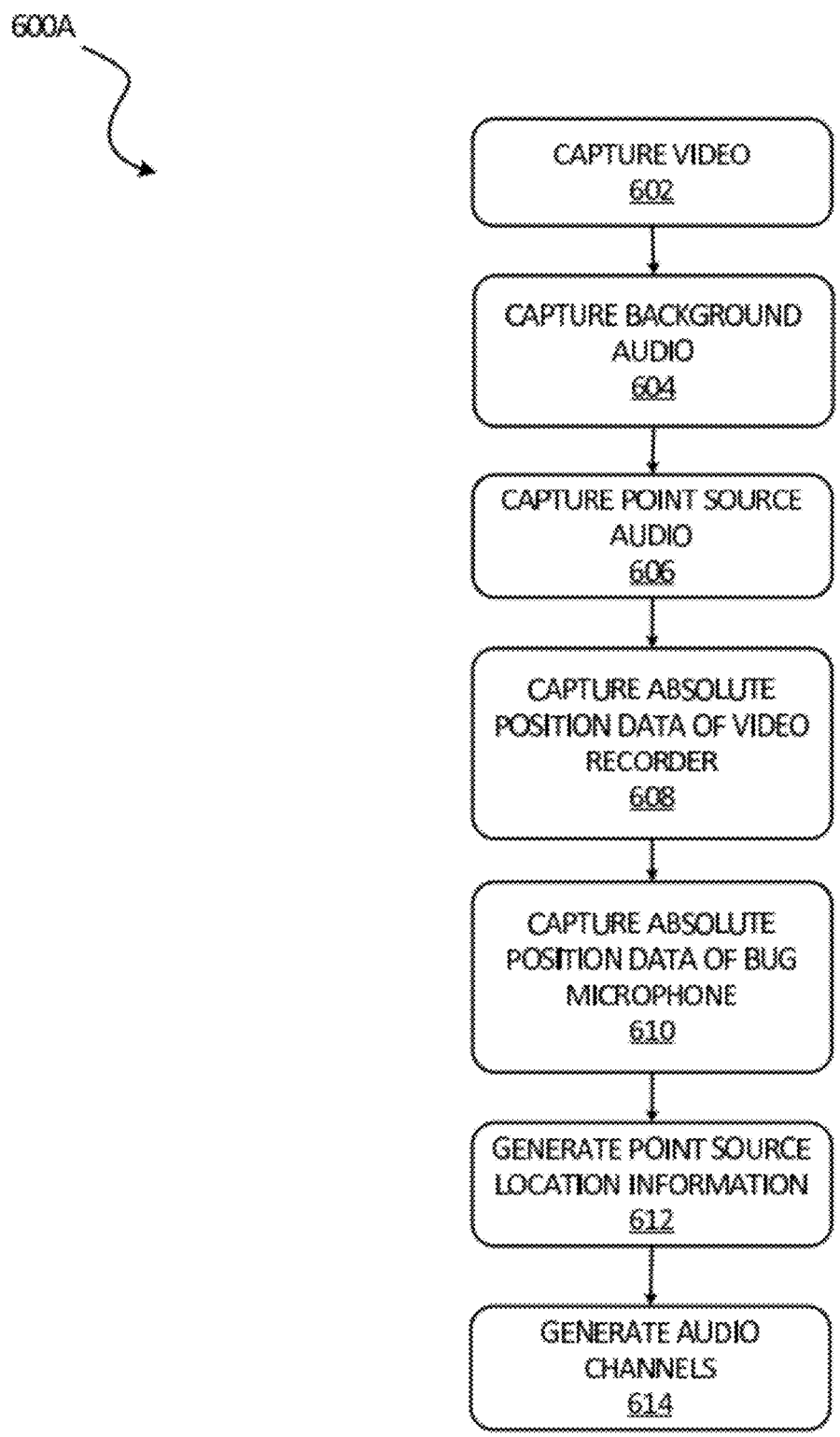

FIG. 6A is a flowchart of a another process 600A for determining the location of bug microphone 110 relative to video recorder 102. As with process 500, process 600A is described with respect to environment 100 of FIG. 1A, in which operator 104 uses video recorder 102 having microphone 106 to capture video of subject 108 wearing bug microphone 110.

Similar to process 500, process 600A begins with the capture of video (block 602), background audio (block 604), and point source audio (block 606). In the example of environment 100, primary camera 302 captures video, microphone 106 captures the background audio, and bug microphone 110 captures point source audio. In process 600, information related to the absolute position and/or direction of video recorder 102 may also be captured (block 608). For example, location detector 312 (e.g., a GPS receiver) may capture location and/or direction information for determining the location of video recorder 102. Video recorder 102 may determine the absolute location or pass the location information (e.g., satellite signals) to computer 120 for computer 120 to determine the absolute position. Motion detector 310 may capture direction information (e.g., via a compass) and pass that information to computer 120. Further, other information (e.g., information from an accelerometer) from motion detector 310 may help refine the absolute position determined by location detector 312.

Further, the absolute position and/or the direction of bug microphone 110 may also be captured (block 610). For example, location detector 326 (e.g., a GPS receiver) in bug microphone 110 may capture location information. Bug microphone 110 may determine the absolute position itself or pass the location information to video recorder 102 or computer 120 for determining the absolute location. Motion detector 328 may capture direction information and pass this information to video recorder 102 and/or computer 120. Further, other information from motion detector 328 (e.g., from an accelerometer) may help refine the absolute position determined by location detector 312.

Position tracking logic 366 may input the absolute location (or determine the absolute location) of video recorder 102 and bug microphone 110 and may generate point source location information (block 612). For example, position tracking logic 366 may output the location of bug microphone 110 relative to primary camera 302 (e.g., direction and/or distance over time). Audio processing logic 370 may input the point source location information and may processing the corresponding recorded audio to generate or modify audio channels (block 614). For example, audio processing logic 370 may output surround sound so that someone watching the video may perceive the sound as coming from the point source (e.g., subject 108 wearing bug microphone 110).

Figure 6B:
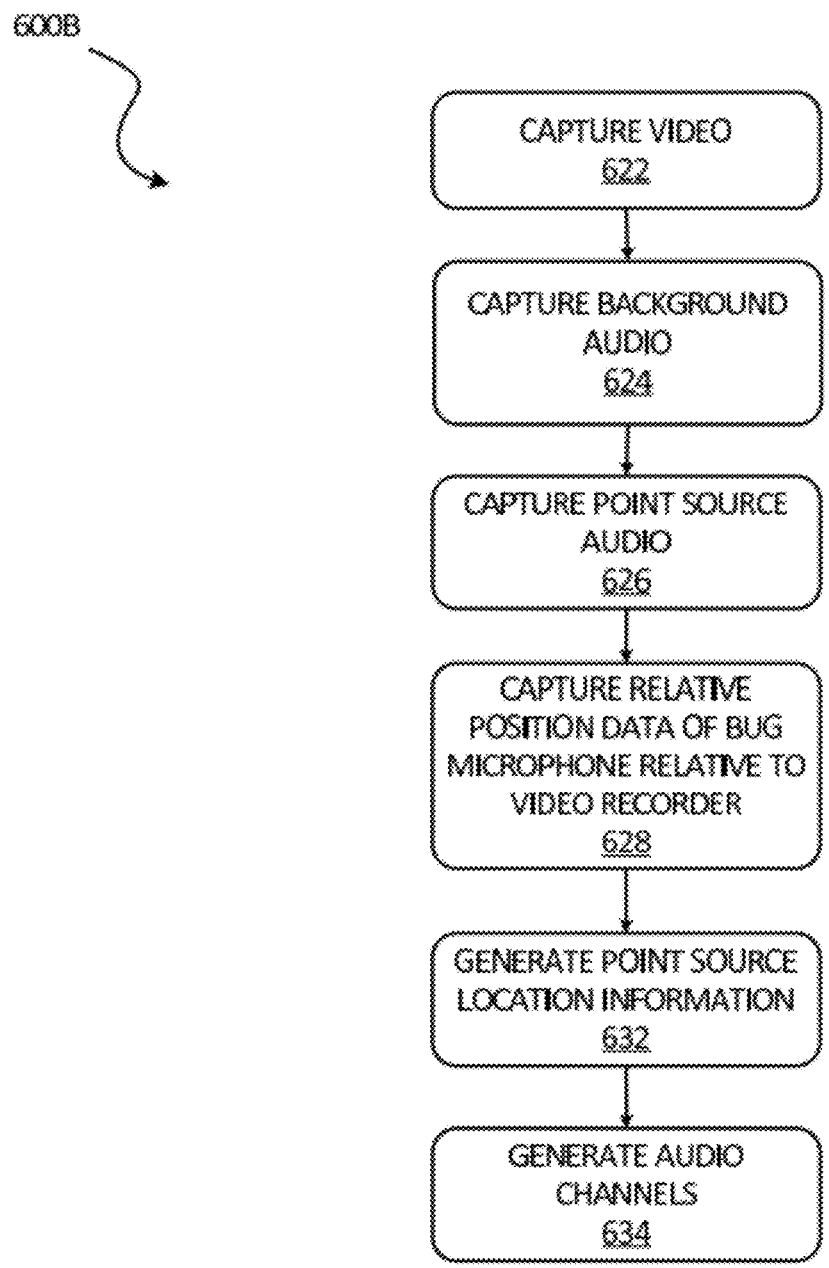

FIG. 6B is a flowchart of another exemplary process 600B for determining the location of bug microphone 110 relative to video recorder 102. As with processes discussed above, processes 600B is described with respect to environment 100.

Process 600B also begins with the capture of video (block 622), background audio (block 624), and point source audio (block 626). In the example of environment 100, primary camera 302 captures video, microphone 106 captures the background audio, and bug microphone 110 captures point source audio. In process 600B, information related to the position and/or direction of bug microphone 110 relative to video recorder 102 may be captured (block 628). For example, IR transmitter 322 in bug microphone 110 may transmit a beacon of light that is captured by IR camera 306. In this example, IR camera 306 may be pointed in the same direction as (or a known direction relative to) primary camera 302. Therefore, the relative position of bug microphone 110 to primary camera 302 may be determined by the position of the received IR light in a frame of IR camera 306.

In addition, in one embodiment, motion detector 328 in bug microphone 110 and/or motion detector 310 in video recorder 102 may capture relative location and/or direction information (e.g., acceleration and/or direction) for determining (or improving the determination of) the location of bug microphone 110 relative to video recorder 102. In one embodiment, the distance of bug microphone 110 relative to video recorder 102 may be determined by the intensity of light received by IR camera 306. Bug microphone 110 may transmit this information to video recorder 102 or to computer 120 to refine the relative location.

Position tracking logic 366 may input the information regarding the position of bug microphone 110 relative to primary camera 302 and may generate point source location information (block 632). For example, position tracking logic 366 may output (e.g., more precisely) the location of bug microphone 110 relative to primary camera 302 (e.g., direction and/or distance over time). Audio processing logic 370 may input the point source location information and may process the corresponding recorded audio (block 634). For example, audio processing logic 370 may output surround sound so that someone watching the video may perceive the sound as coming from the point source (e.g., subject 108 wearing bug microphone 110).

Figure 7A:
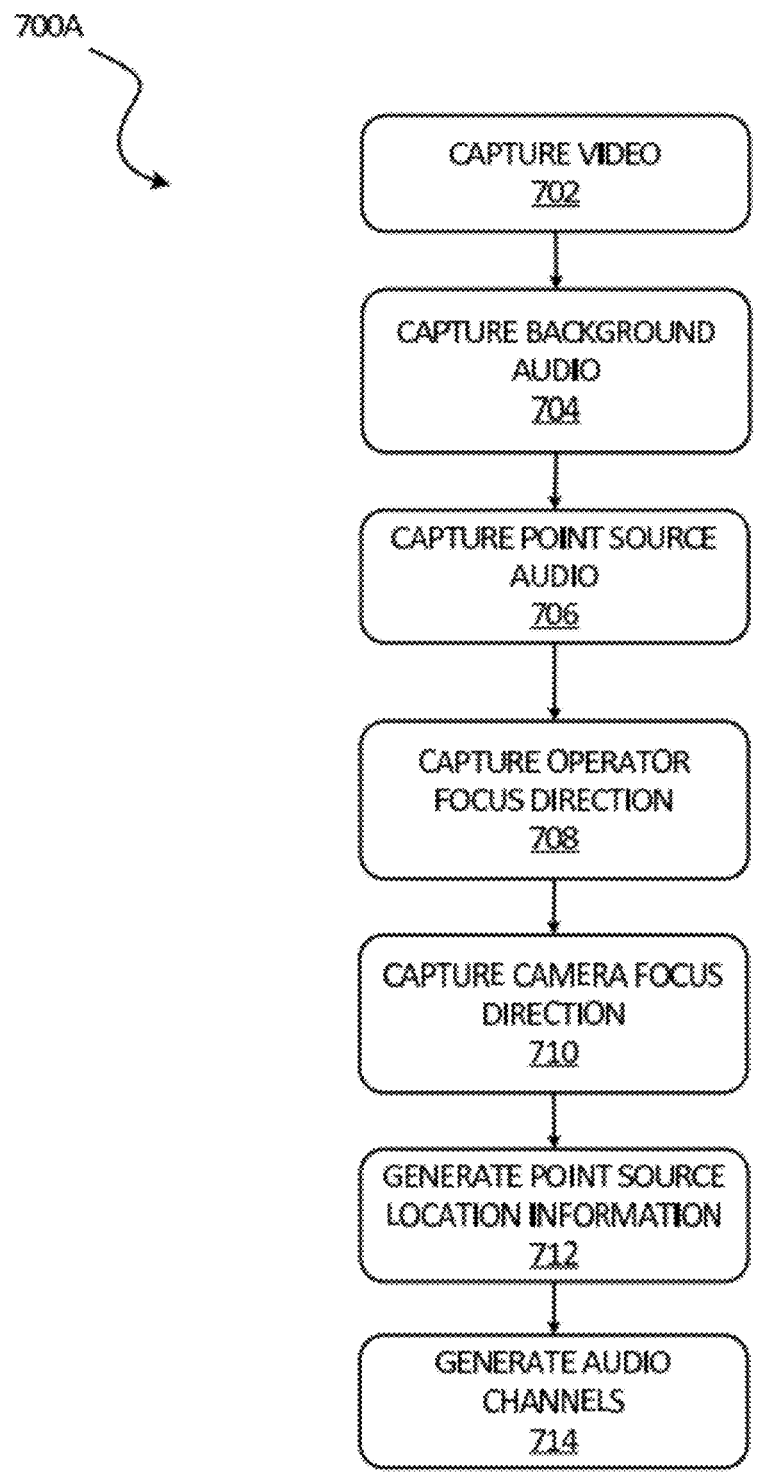

FIG. 7A is a flowchart of a process 700A for determining the position of bug microphone 110 relative to video recorder 102. As with the processes discussed above, process 700A is described with respect to environment 100. Process 700A begins with the capture of video (block 702), background audio (block 704), and point source audio (block 706). Primary camera 302 captures video, microphone 106 captures the background audio, and bug microphone 110 captures point source audio. Information related to the focus of operator 104 (e.g., the absolute direction of the head and/or eyes of operator 104) may also be captured (block 708). For example, direction detector 344 (e.g., a compass and/or a camera in headset 112) may capture direction information for determining the focus of operator 104. Direction detector 344 may take into account the direction of headset 112 as well as the direction of the eyes of operator 104. Headset 112 may determine the direction or pass the location information to video recorder 102 or computer 120 for determining the direction.

Further, the focus (e.g., direction) of video recorder 102 may also be captured (block 710). For example, motion detector 310 (e.g., a compass and/or accelerometer) in video recorder 102 may capture direction information. Video recorder 102 may determine the direction (e.g., absolute) of itself or pass the information to computer 120 for determining the direction (e.g., absolute).

Operator tracking logic 368 may input the direction of video recorder 102 and the direction of operator 104 and may generate point source location information (block 712). For example, position tracking logic 366 may output the location of bug microphone 110 relative to primary camera 302 (e.g., direction and/or distance over time). Audio processing logic 370 may input the point source location information and may process the recorded audio to generate or modify audio channels (block 714). For example, audio processing logic 370 may output surround sound so that someone watching the corresponding video may perceive the sound as coming from the point source (e.g., subject 108 wearing bug microphone 110).

Figure 7B:
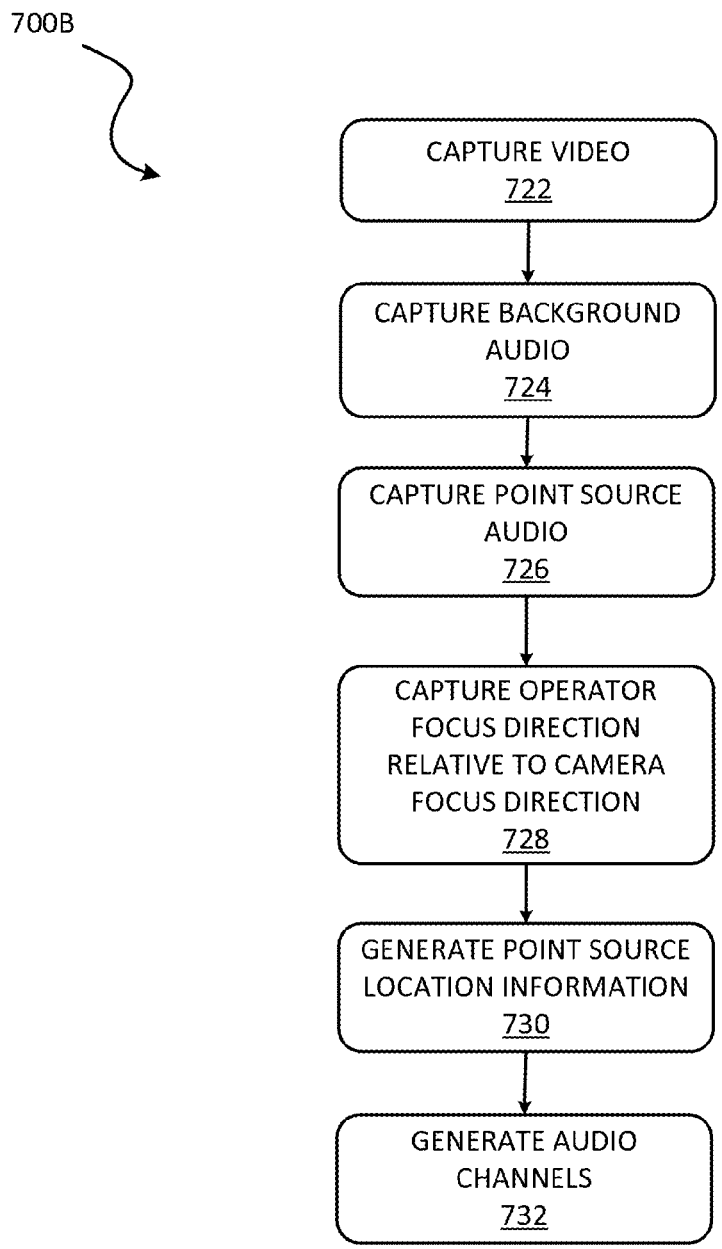

FIG. 7B is a flowchart of a process 700B for determining the location of bug microphone 110 relative to video recorder 102. As with the process discussed above, processes 700B is described with respect to environment 100. Process 700B begins with the capture of video (block 722), background audio (block 724), and point source audio (block 726). In the example of environment 100, primary camera 302 captures video, microphone 106 captures the background audio, and bug microphone 110 captures point source audio. Information related to the direction of focus of operator 104 relative to the focus of video recorder 102 may be captured (block 728). For example, secondary camera 304 on video recorder 102 may capture the image of operator 104. In addition, in one embodiment, direction detector 344 in headset 112 may also capture direction information for helping the determination of the direction of focus of operator 104 relative to video recorder 102.

Operator tracking logic 368 may input the information regarding the direction of focus of operator 104 relative to video recorder 102 (block 730). For example, operator tracking logic 368 may output (e.g., more precisely) the location of bug microphone 110 relative to primary camera 302 (e.g., a distance and angle over time). Audio processing logic 370 may input the point source location information and may processing the corresponding sounds from the point source (block 732). For example, audio processing logic 370 may output surround sound so that someone watching the video may perceive the sound as coming from the point source (e.g., subject 108 wearing bug microphone 110).

CONCLUSION

Embodiments discussed above allow for the determination of the location of microphones relative to a camera. This location information may be used to generate or modify audio channels for reproduction. The additional or modified audio channels may include audio channels for stereo sound, surround sound, etc.

The foregoing description of implementations provides illustration, but is not intended to be exhaustive or to limit the implementations to the precise form disclosed. Modifications and variations are possible in light of the above teachings or may be acquired from practice of the teachings. For example, examples discussed above include recording audio while simultaneously recording video. In other examples and embodiments, video may not recorded. In such an embodiment, the recorded audio may processed to generate or modify audio channels for a user listening experience (e.g., not for a user listening and watching experience).

Further, although the examples above relate to audio processing subsequent to the capture of audio and video, the audio processing may occur while audio and video is being captured. In this example, the audio effects introduced by the signal processing may be enjoyed even while watching a live broadcast.

Although IR camera 306 and primary camera 302 are described as two separate cameras, in one embodiment IR camera 306 and primary camera 302 may be combined into a single camera. In this embodiment, the camera may be sensitive to visible light as well as IR light.

The term "location" or "position" as used herein means position described by one, two, or three dimensions. For example, the location of bug microphone 110 relative to primary camera 302 may be described by direction from primary camera 302 (e.g., azimuth and/or elevation); distance from primary camera 302; and/or distance and direction from primary camera 302. The location of primary camera 302 may also be described by latitude, longitude, and/or elevation.

Additionally, while series of blocks have been described with regard to the exemplary processes in FIGS. 5A, 5B, 6A, 6B, 7A, and 7B, the order of the blocks may be modified in other implementations. In addition, non-dependent blocks may represent acts that can be performed in parallel to other blocks.

Aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

The term "comprises/comprising," as used herein, specifies the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
    a memory to store video recorded with a camera, audio recorded with a microphone, information indicative of a focus of an operator of the camera, and motion information related to motion of the microphone while recording the audio with the microphone;
        wherein the video, the audio, and the information indicative of the focus of the operator were recorded simultaneously during a time period, and wherein the microphone is configured to move relative to the camera; and
    a processor to
        receive a selection from a user of an object in the video, wherein the object is collocated with the microphone that recorded the audio,
        track the object in the video by using the motion information related to the motion of the microphone,
        determine a location of the microphone relative to the camera over the time period based on the information indicative of the focus of the operator of the camera and based on the tracking of the object, and
        process the recorded audio to generate additional or modified audio channels based on the location of the microphone.

2. The device of claim 1, wherein the processor is further configured to:
    generate surround-sound audio channels; or
    generate head-related transfer function audio channels.

3. The device of claim 1,
    wherein the memory is further configured to store motion information related to motion of the camera while the camera receives video, and
    wherein the processor is further configured to track the object in the video using the motion information related to the camera.

4. A system comprising:
    a camera and a microphone, wherein the microphone is configured to move relative to the camera;
    a memory to store
        video recorded with the camera, audio recorded with the microphone, information indicative of a focus of an operator of the camera, and motion information related to motion of the microphone while recording the audio with the microphone, wherein the video, audio, and information indicative of the focus of the operator were recorded simultaneously during a time period; and
    a processor to
        receive a selection from a user of an object in the video, wherein the object is collocated with the microphone that recorded the audio,
        track the object in the video by using the motion information related to the motion of the microphone,
        determine a location of the microphone relative to the camera over the time period based on the information indicative of the focus of the operator and based on the tracking of the object; and
        process the recorded audio to generate additional or modified audio channels based on the location of the microphone relative to the camera.

5. The system device of claim 4,
    wherein the memory is further configured to store
        first absolute location information indicative of an absolute location of the camera over the time period;
        second absolute location information indicative of an absolute location of the microphone over the time period, wherein the location information includes the first absolute location information and the second absolute location information; and wherein the processor is further configured to determine the location of the microphone relative to the camera over the time period based on the first absolute location information and the second absolute location information.

6. The system of claim 5, wherein the first absolute location information or the second absolute location information includes global position system (GPS) information.

7. The system of claim 4,
wherein the memory is further configured to store direction information indicative of a direction of the camera, wherein the processor is further configured to determine the location of the microphone relative to the camera based on the direction information.

8. The system of claim 4,
wherein the camera is a first camera,
wherein the memory is configured to store a recording, captured by a second camera, of a beacon light over the time period, wherein the location information includes the recording of the beacon light, wherein the beacon light is collocated with the microphone; and
wherein the processor is configured to determine the location of the microphone relative to the camera over the time period based on the recording of the beacon light over the time period.

9. The system of claim 8, wherein the beacon light includes infra-red (IR) light and the second camera is an IR camera.

10. The system of claim 8, wherein the processor is further configured to:
generate surround-sound audio channels;
generate stereo audio channels; or
generate head-related transfer function audio channels.

11. The system of claim 8,
wherein the memory is further configured to store motion information related to motion of the camera over the time period, and
wherein the processor is configured to determine the location based on the motion information related to the motion of the camera.

12. A computer-implemented method comprising:
receiving video recorded with a camera, audio recorded with a microphone, information indicative of a focus of an operator of the camera, and motion information related to motion of the microphone while recording the audio with the microphone,
wherein the video, audio, and information indicative of the operator were recorded simultaneously during a time period, and wherein the microphone is configured to move relative to the camera;
receiving a selection from a user of an object in the video, wherein the object is collocated with the microphone that recorded the audio;
tracking the object in the video by using the motion information related to the motion of the microphone;
determining a location of the microphone relative to the camera over the time period based on the information indicative of the focus of the operator of the camera and based on the tracking of the object; and
processing the recorded audio to generate additional or modified audio channels based on the location, of the microphone, determined based on the information indicative of the focus of the operator of the camera and based on the tracking of the object.

13. The computer-implemented method of claim 12, wherein the received video is a first received video and the camera is a first camera, wherein receiving the information indicative of the focus of the operator includes receiving a second video of the operator from a second camera recorded simultaneously with the first video, wherein the second camera is in a known location relative to the first camera, the method further comprising:
determining the focus of the operator of the camera based on the second video of the operator from the second camera.

14. The computer-implemented method of claim 13, wherein the first camera and the second camera face opposite directions.

15. The computer-implemented method of claim 12, further comprising:
receiving first direction information indicative of the direction of a headset worn by the operator, wherein determining the location of the microphone relative to the camera includes determining the location of the microphone relative to the camera based on the first direction information.

16. The computer-implemented method of claim 15, further comprising:
receiving second direction information indicative of the direction of the camera, wherein determining the location of the microphone relative to the camera includes determining the position of the microphone relative to the camera based on the second direction information.

17. The computer-implemented method of claim 15, further comprising:
generating surround-sound audio channels;
generating stereo audio channels; or
generating head-related transfer function audio channels.

* * * * *